(12) United States Patent
Haneda et al.

(10) Patent No.: US 8,317,238 B2
(45) Date of Patent: Nov. 27, 2012

(54) BUMPER DEVICE FOR VEHICLE

(75) Inventors: Shinichi Haneda, Anjo (JP); Kiyoichi Kita, Okazaki (JP); Tamaki Ohbayashi, Toyama (JP); Kyousuke Matsui, Toyama (JP)

(73) Assignees: Aisin Seiki Kabushiki Kaisha, Kariya-shi, Aichi-ken (JP); Aisin Keikinzoku Kabushiki Kaisha, Tomoya-ken (JP)

( * ) Notice: Subject to any disclaimer, the term of this patent is extended or adjusted under 35 U.S.C. 154(b) by 0 days.

(21) Appl. No.: 13/137,235

(22) Filed: Jul. 29, 2011

(65) Prior Publication Data

US 2012/0025546 A1    Feb. 2, 2012

(30) Foreign Application Priority Data

Jul. 30, 2010    (JP) .................................. 2010-172979

(51) Int. Cl.
    *B60R 19/34*    (2006.01)
(52) U.S. Cl. ..................... 293/117; 293/133; 293/154
(58) Field of Classification Search .................. 296/117, 296/133, 154, 102; 293/117, 133, 154, 102
    See application file for complete search history.

(56) References Cited

U.S. PATENT DOCUMENTS

| 6,554,333 B2 * | 4/2003 | Shimotsu et al. | 293/132 |
| 6,814,381 B1 * | 11/2004 | Frank | 293/133 |
| 6,908,129 B2 * | 6/2005 | Shimotsu | 293/133 |
| 2002/0113447 A1 * | 8/2002 | Frank | 293/133 |
| 2003/0209915 A1 * | 11/2003 | Yoshida | 293/133 |
| 2003/0222477 A1 * | 12/2003 | Yoshida et al. | 296/187.03 |
| 2004/0041416 A1 * | 3/2004 | Harrison et al. | 293/117 |
| 2004/0169383 A1 * | 9/2004 | Shimotsu | 293/133 |
| 2004/0207217 A1 * | 10/2004 | Muller et al. | 293/133 |
| 2005/0067845 A1 * | 3/2005 | Frank | 293/133 |
| 2005/0212311 A1 * | 9/2005 | Haneda et al. | 293/117 |
| 2006/0290150 A1 * | 12/2006 | Roll et al. | 293/133 |

(Continued)

FOREIGN PATENT DOCUMENTS

DE    101 10 332    9/2002

(Continued)

OTHER PUBLICATIONS

Extended European Search Reported for EP Appl. No. 11176033.6 dated Dec. 6, 2011.

*Primary Examiner* — Jason S Morrow

(74) *Attorney, Agent, or Firm* — Finnegan, Henderson, Farabow, Garrett & Dunner, LLP

(57) ABSTRACT

A bumper device for a vehicle, includes a bumper reinforcement extending in a width direction of the vehicle, a connecting member extending in a longitudinal direction of the vehicle and connected to an end portion of the bumper reinforcement, the connecting member including a bottom wall portion that is in contact with the bumper reinforcement, a fitting bore formed in either one of the bottom wall portion and a contact wall portion of the bumper reinforcement, an insertion portion formed at the other one of the bottom wall portion and the contact wall portion and inserted in the fitting bore, and a flange extending from an edge of the insertion portion, wherein the one of the bottom wall portion and the contact wall portion, including the fitting bore is supported by the flange and the other one of the bottom wall portion and the contact wall portion, including the flange.

4 Claims, 4 Drawing Sheets

U.S. PATENT DOCUMENTS

| | | | |
|---|---|---|---|
| 2007/0182170 A1* | 8/2007 | Renault et al. | 293/102 |
| 2007/0182176 A1* | 8/2007 | Muskos | 293/133 |
| 2009/0026777 A1* | 1/2009 | Schmid et al. | 293/133 |
| 2009/0174197 A1* | 7/2009 | Pascual Barrio et al. | 293/102 |
| 2009/0206617 A1* | 8/2009 | Ahlin | 293/117 |
| 2010/0102582 A1* | 4/2010 | Hashimoto et al. | 293/154 |
| 2010/0289300 A1 | 11/2010 | Kokubo | |
| 2011/0233947 A1* | 9/2011 | Baccouche et al. | 293/133 |

FOREIGN PATENT DOCUMENTS

| | | |
|---|---|---|
| JP | 11-208393 | 8/1999 |
| JP | 2000-127873 | 5/2000 |
| JP | 2004-237818 | 8/2004 |
| JP | 2004-255991 | 9/2004 |
| WO | WO 2007/097310 | 8/2007 |

* cited by examiner

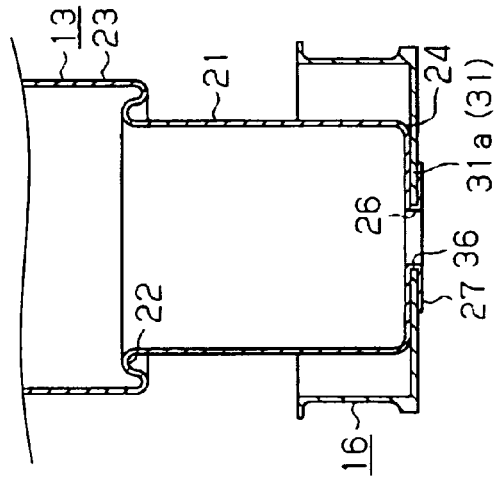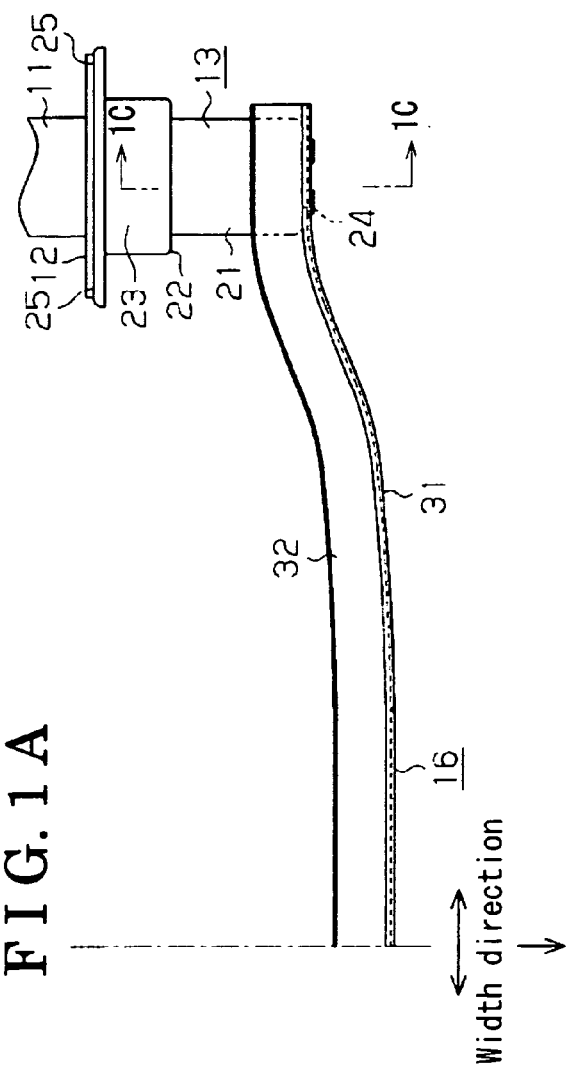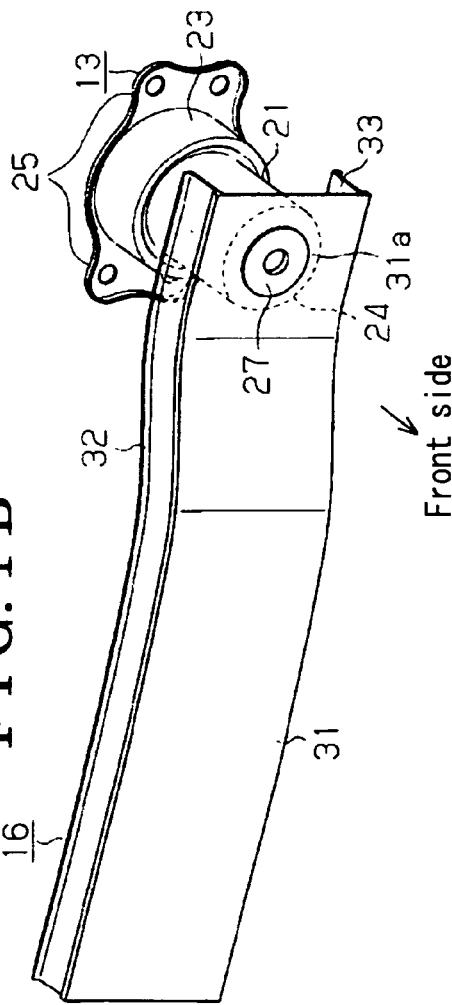

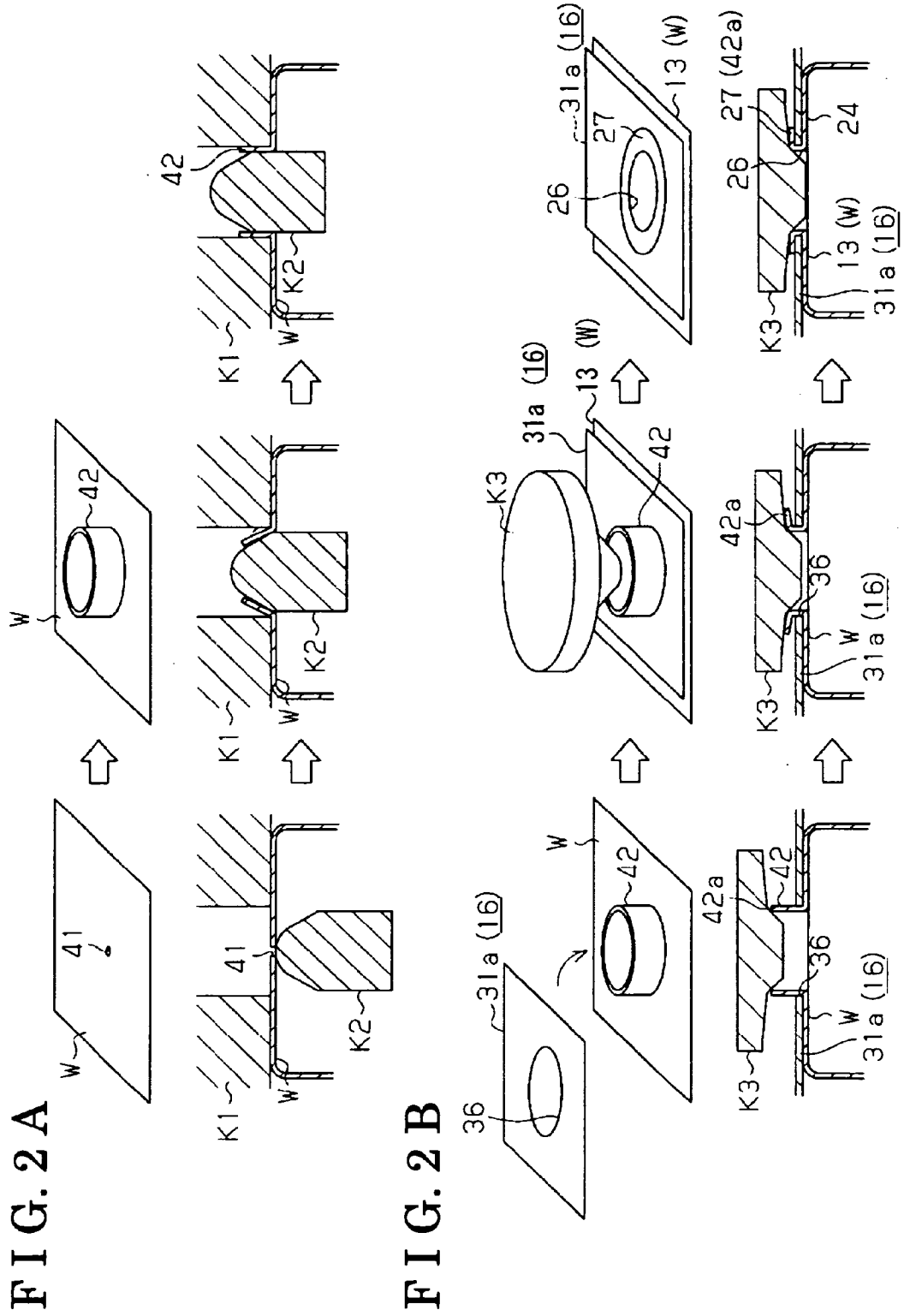

FIG. 3A
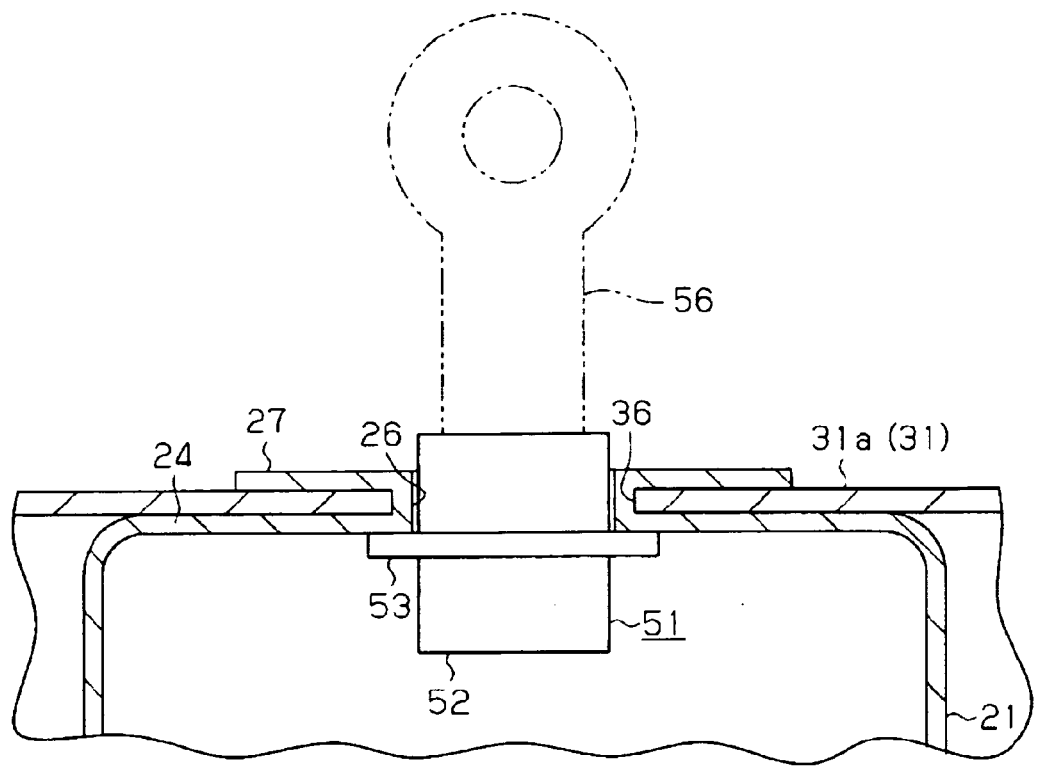
FIG. 3B                    Prior Art
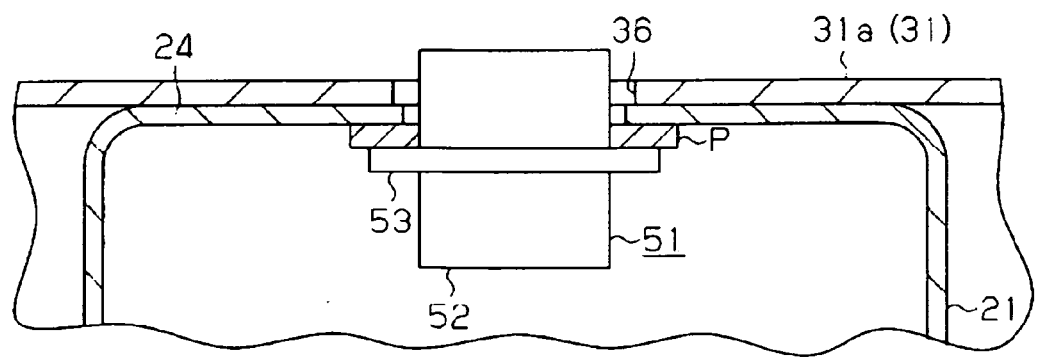

Front side

Front side

BUMPER DEVICE FOR VEHICLE

CROSS REFERENCE TO RELATED APPLICATIONS

This application is based on and claims priority under 35 U.S.C. §119 to Japanese Patent Application 2010-172979, filed on Jul. 30, 2010, the entire content of which is incorporated herein by reference.

TECHNICAL FIELD

This disclosure generally relates to a bumper device for a vehicle.

BACKGROUND DISCUSSION

Various known bumper devices for vehicles are provided. For example, an attachment structure of a bumper reinforcement of a known bumper device is disclosed in JP2000-127873A (hereinafter referred to as Reference 1, see FIG. 1). In the bumper device according to Reference 1, the bumper reinforcement extends in a width direction of the vehicle. Crush boxes extending in a longitudinal direction of the vehicle are fixed to both end portions of the bumper reinforcement in the width direction by bolts and nuts. A clearance is formed between a rear wall portion of the bumper reinforcement and an inclined surface of each of the crush boxes. The inclined surface is inclined by a predetermined angle relative to the rear wall portion from an interior side in the width direction toward a rearward side of the vehicle. The crush box includes outer and inner panels in the width direction. For example, even in a case where a front collision of the vehicle occurs and the bumper reinforcement is thereby deformed, a compressive load acting in the longitudinal direction is inhibited by the aforementioned clearance from being applied to a front portion of a side surface of the inner panel.

Moreover, an attachment structure of a bumper reinforcement of a known bumper device for a vehicle is disclosed in JPH11 (1999)-208393A (hereinafter referred to as Reference 2, see FIG. 1). Side members extending in a longitudinal direction of the vehicle are arranged at both end portions of the bumper reinforcement extending in a width direction of the vehicle. Each of the end portions of the bumper reinforcement is fixed to a front end surface of each of the side members via a bumper stay by bolts and nuts. The bumper stay is formed by an extruded member, for example, made of aluminum alloy. The bumper stay includes a front wall portion, a longitudinal wall portion extending in the longitudinal direction, and a bead formed at the longitudinal wall portion. The front wall portion having a substantially triangle shape in cross section is formed to conform to an inclination of a curved shape of the end portion of the bumper reinforcement. The bead allows bending strength of the longitudinal wall portion to be lower than bending strength of the bumper reinforcement. Accordingly, for example, even in an occurrence of an offset collision against a portion of a front side of the vehicle, the side member is surely squashed in the longitudinal direction by the bead arranged at the longitudinal wall portion.

As described above, in the bumper device according to Reference 1, the crush box is fixed to the bumper reinforcement by the bolts and the nuts. Likewise, in the bumper device according to Reference 2, the bumper stay is fixed to the bumper reinforcement by the bolts and the nuts. Accordingly, the number of components of the bumper device according to each of References 1 and 2 increases. In addition, an axial length of each of the bolts and an axial length of each of the nuts are included in the longitudinal direction. Therefore, a length of the crush box or the bumper stay in the longitudinal direction needs to be increased in order to secure a compression distance in the longitudinal direction so that the crush box or the bumper stay may sufficiently absorb impact energy due to the aforementioned front collision or the offset collision. As a result, according to the bumper device disclosed in each of References 1 and 2, the length of each of the crush box and the bumper stay in the longitudinal direction needs to be increased.

A need thus exists for a bumper device for a vehicle, which is not susceptible to the drawback mentioned above.

SUMMARY

According to an aspect of this disclosure, a bumper device for a vehicle includes a bumper reinforcement extending in a width direction of the vehicle, a connecting member extending in a longitudinal direction of the vehicle and being connected to an end portion of the bumper reinforcement in the width direction, the connecting member being formed into a cylindrical hollow shape and including a bottom wall portion that is in contact with the bumper reinforcement in the longitudinal direction, a fitting bore formed in either one of the bottom wall portion of the connecting member and a contact wall portion of the bumper reinforcement, the contact wall portion being in contact with the bottom wall portion, an insertion portion formed at the other one of the bottom wall portion and the contact wall portion and inserted in the fitting bore to be fitted thereto, the insertion portion being formed into a hollow cylindrical shape, and a flange extending from an edge of the insertion portion, wherein the one of the bottom wall portion and the contact wall portion, including the fitting bore is supported by the flange and the other one of the bottom wall portion and the contact wall portion, including the flange.

According to another aspect of the disclosure, a bumper device for a vehicle includes a bumper reinforcement extending in a width direction of the vehicle and including a contact wall portion, a connecting member extending in a longitudinal direction of the vehicle and being connected to an end portion of the bumper reinforcement in the width direction, the connecting member being formed into a cylindrical hollow shape and including a bottom wall portion that is in contact with the contact wall portion of the bumper reinforcement in the longitudinal direction, a fitting bore formed in either one of the bottom wall portion of the connecting member and the contact wall portion of the bumper reinforcement, an insertion portion formed at the other one of the bottom wall portion and the contact wall portion and inserted in the fitting bore to be fitted thereto, the insertion portion being formed into a hollow cylindrical shape, and a flange extending radially outwardly from an edge of the insertion portion and having an annular shape, wherein the one of the bottom wall portion and the contact wall portion, including the fitting bore is supported by the flange and the other one of the bottom wall portion and the contact wall portion, including the flange.

BRIEF DESCRIPTION OF THE DRAWINGS

The foregoing and additional features and characteristics of this disclosure will become more apparent from the following detailed description considered with the reference to the accompanying drawings, wherein:

FIG. 1A is a plan view of a bumper reinforcement of a bumper device for a vehicle, according to an embodiment disclosed here;

FIG. 1B is a perspective view of the bumper reinforcement of the bumper device according to the embodiment discloser here;

FIG. 1C is a cross-sectional view taken along the line 1C-1C in FIG. 1A;

FIG. 2A is a schematic view illustrating how to connect a crush box of the bumper device to the bumper reinforcement;

FIG. 2B is a schematic view illustrating how to connect the crush box to the bumper reinforcement;

FIG. 3A is a cross-sectional view of the bumper reinforcement according to a first modified example of the embodiment disclosed here;

FIG. 3B is a cross-sectional view of a bumper reinforcement of a known bumper device;

DETAILED DESCRIPTION

Figure 4A:
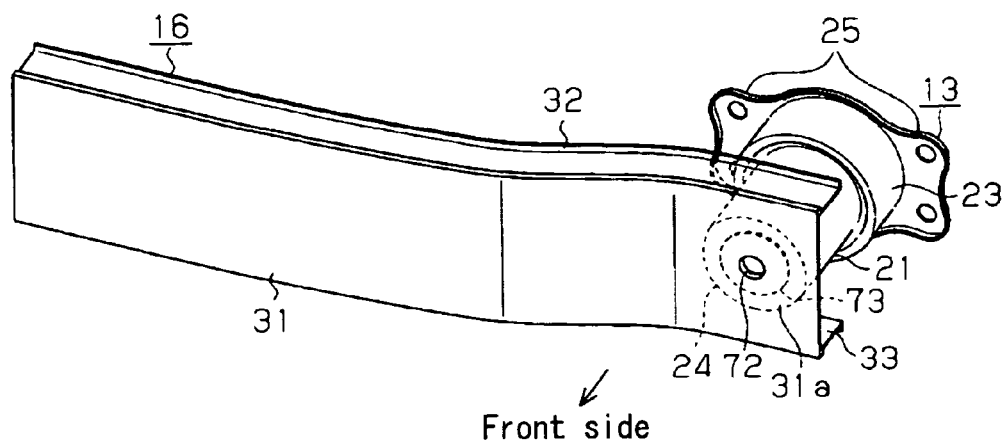
FIG. 4A is a perspective view of the bumper reinforcement according to a second modified example of the embodiment disclosed here.

An embodiment of this disclosure will be described with reference to illustrations of the attached drawing as follows. FIGS. 1A and 1B are plan and perspective views illustrating a bumper device for a vehicle, according to the embodiment. The bumper device is attached to a front portion of the vehicle such as an automobile. FIG. 1C is a cross-sectional view taken along the line 1C-1C in FIG. 1A. The bumper device has a symmetric shape in a width direction of the vehicle (bilaterally symmetric shape). Therefore, a right side of the bumper device attached to the front portion of the vehicle is omitted from FIGS. 1A, 1B, and 1C; however, a left side of the bumper device is shown in FIGS. 1A, 1B, and 1C.

As illustrated in FIG. 1A, a pair of side members 11, for example, made of a metal plate and extending along a longitudinal direction of the vehicle is arranged in the width direction. Each of the side members 11 is formed into a substantially hollow rectangular shape in cross section. The side member 11 constitutes a portion of a vehicle body. A bracket 12, for example, made of a metal plate and having a substantially rectangular shape is welded to a front end of the side member 11 so as to close an opening of the side member 11.

The bumper device includes crush boxes 13 serving as connecting members. The crush boxes 13 extending in the longitudinal direction are arranged in the width direction. Each of the crush boxes 13 is attached to a front surface of the bracket 12. The crush box 13 is formed by a deep drawing steel sheet. In particular, a steel plate (for example, SPC270 and SCGA0270 materials that are cold-rolled steel sheets) is formed by a deep drawing process and is thereafter hardened, so that the deep drawing steel sheet having a tensile strength of 440 MPa is obtained. In addition, as illustrated in FIGS. 1A, 1B, and 1C, the crush box 13 integrally includes a small-diameter portion 21, an annular stepped portion 22, a large-diameter portion 23, and a bottom wall portion 24 having a circular plate shape. The small-diameter portion 21 has a hollow cylindrical shape. The large-diameter portion 23 having a hollow cylindrical shape has an outer diameter larger than an outer diameter of the small-diameter portion 21. The large-diameter portion 23 is connected via the annular stepped portion 22 to the small-diameter portion 21. The bottom wall portion 24 closes an open end (front open end) of the small-diameter portion 21. The crush box 13 (small-diameter portion 21, large-diameter portion 23, and the like) has a central axis extending along the longitudinal direction. The crush box 13 is arranged so that the central axis is aligned with a central axis of the side member 11, which extends along the longitudinal direction. In addition, the annular stepped portion 22 serves to promptly generate permanent deformation of the small-diameter portion 21, i.e. the annular stepped portion 22 allows the small-diameter portion 21 to be quickly deformed toward the large-diameter portion 13 along the central axis.

Plural attachment portions 25 having plate shapes are integrally formed with a rear end of the large-diameter portion 23 so as to radially outwardly extend therefrom (for example, in the embodiment, the two attachment portions 25 are provided in predetermined angular positions of the large-diameter portion 23 in the width direction). A nut is fastened to a threaded portion of a bolt penetrating through the bracket 12; thereby, the crush box 13 and the attachment portions 25 are fixed to the bracket 12 (side member 11).

Moreover, the bumper device includes a bumper reinforcement 16 extending in the width direction. The bumper reinforcement 16 is formed by an extruded member, for example, made of aluminum or aluminum alloy. The respective bottom wall portions 24 of the crush boxes 13 are fixed to both end portions of the bumper reinforcement 16 in the width direction. Each of the crush boxes 13 formed by the deep drawing process and hardened is formed of a material having rigidity higher than rigidity of a material of the bumper reinforcement 16. In addition, the bumper reinforcement 16 includes a main wall portion 31 and a pair of facing wall portions 32 and 33 facing each other in the vertical direction. The main wall portion 31 serves as a contact wall portion having an elongated shape extending in the width direction. A length of the contact wall portion in a vertical direction of the vehicle is longer than the outer diameter of the large-diameter portion 23 in the vertical direction. The facing wall portions 32 and 33 are continuously formed with upper and lower ends, respectively, of the main wall portion 31 so as to be curved therefrom toward the large-diameter portion 23 in the longitudinal direction. In other words, the bumper reinforcement 16 has an approximately U-shape having an opening that faces the crush boxes 13. The bottom wall portion 24 of each of the crush boxes 13 is in contact with an intermediate portion of the bumper reinforcement 16 in the vertical direction. A circular portion of the main wall portion 31, which is in contact with the bottom wall portion 24 will be hereinafter referred to as a contact portion 31a constituting a portion of the main wall portion (contact wall portion) 31.

A connection structure between the bumper reinforcement 16 and the crush boxes 13 will be explained as follows. As illustrated in FIG. 1C, a fitting bore 36 having an approximately circular shape is formed in a central portion of the contact portion 31a of the main wall portion 31 of the bumper reinforcement 16. Meanwhile, an insertion portion 26 formed into a substantially cylindrical hollow shape is formed at a central portion of the bottom wall portion 24 so as to protrude therefrom toward a front side of the vehicle. The insertion portion 26 is inserted in the fitting bore 36. In addition, a flange 27 having an approximately annular shape is formed so as to radially outwardly extend from an edge (front edge) of the insertion portion 26. The flange 27 is crimped to a circumferential edge of the fitting bore 36 so as to be fixed therearound. Further, the contact portion 31a is supported between the bottom wall portion 24 and the flange 27 so as to be positioned around the circumferential edge of the fitting bore 36. Thus, each of the crush boxes 13 is connected to the bumper reinforcement 16. In addition, the flange 27 continuously and entirely extends along the circumferential edge of the fitting bore 36, thereby increasing the strength of the flange 27.

Under such connection structure, in a case where a front collision of the vehicle occurs and an impact due to the front collision thereby acts on the vehicle, the impact is transmitted through the bumper reinforcement 16 and the crush boxes 13 to the side members 11 (the vehicle body). At this time, the crush boxes 13 are permanently deformed, thereby absorbing the impact that will be transmitted to the vehicle body and the occupant. In other words, an axial compressive load due to the impact is applied to each of the crush boxes 13. Then, the crush box 13 absorbs the axial compressive load. As a result, the crush box 13 is permanently deformed in such a way that the small-diameter portion 21 is squashed via the annular stepped portion 22 toward an inner space defined at an inner circumferential side of the large-diameter portion 23. The inner space of the large diameter portion 23 allows the small-diameter portion 21 to be squashed or shrunk along the central axis. Thus, the crush box 13 absorbs energy of the impact due to the front collision of the vehicle.

Next, how to connect the crush boxes 13 to the bumper reinforcement 16 will be described as follows. As illustrated in FIG. 2A, a bore 41 having an approximately circular shape is formed in a work W formed by a metal plate and corresponding to the bottom wall portion 24 of each of the crush boxes 13. The bore 41 has an inner diameter smaller than an inner diameter of the insertion portion 26. A first die K1 having an approximately hollow cylindrical shape is arranged on a surface of the work W, which faces the contact surface 31a. The first die K1 has an inner diameter substantially equal to an outer diameter of the insertion portion 26. Meanwhile, a punch K2 having a substantially bell-shaped protruding end portion that protrudes toward the work W is arranged axially in an opposite direction of the first die K1 relative to the work W. The punch K2 has an outer diameter substantially equal to the inner diameter of the insertion portion 26. In a state where the first die K1 and the punch K2 are arranged coaxially with each other, for example, the punch K2 is shifted toward the first die K1 along the axial direction. Then, a circumferential edge of the bore 41 is processed to be bent vertically upward toward the first die K1, i.e. the circumferential edge of the bore 41 is formed by a burring process. Thus, a bent-up portion 42 which has an approximately hollow cylindrical shape is formed, thereby forming the insertion portion 26 and the like.

Further, as illustrated in FIG. 2B, the bent-up portion 42 is inserted in the fitting bore 36 of the contact portion 31a of the bumper reinforcement 16 and the work W is brought in close contact with the contact portion 31a by an outer circumferential side of the bent-up portion 42. Under such condition, a circumferential edge 42a of the bent-up portion 42 inserted in the fitting bore 36 is processed and extended radially outwardly by a crushing process by the use of a second die K3, which has an outer diameter larger than an outer diameter of the bent-up portion 42. As a result, the circumferential edge 42a of the bent-up portion 42 forms the flange 27 and a base end of the bent-up portion 42 forms the insertion portion 26. Thus, the crush box 13 and the bumper reinforcement 16 are connected to each other simultaneously when the crush box 13 is completely formed.

As described above, according to the bumper device of the embodiment, following effects will be obtained. The main wall portion 31 of the bumper reinforcement 16 is supported between the bottom wall portion 24 and the flange 27 of each of the crush boxes 13 arranged in the width direction, thereby connecting the crush boxes 13 to the end portions of the bumper reinforcement 16 in the width direction. Accordingly, bolts and nuts are not needed to connect or fix the crush boxes 13 to the bumper reinforcement 16, resulting in a reduction of components of the bumper device. In addition, according to the bumper device of the embodiment, because an axial length of a head portion of each of the bolts and an axial length of each of the nuts are not included in a length of each of the crush boxes 13 along the central axis (in the longitudinal direction of the vehicle), the length of the crush box 13 in the longitudinal direction is inhibited from increasing. As a result, the size of the crush box 13 may be reduced. Moreover, because the bolts and the like are unnecessary, the weight of the bumper device may be reduced.

According to the bumper device of the embodiment, the crush box 13 hardened and having the flange 27 is formed of the material having the rigidity higher than the rigidity of the bumper reinforcement 16, therefore allowing the contact portion 31a to be appropriately in close contact with the flange 27 and to be surely supported between the flange 27 and the bottom wall portion 24.

According to the bumper device of the embodiment, the flange 27 continuously and entirely extends along the circumferential edge of the fitting bore 36, thereby securing the strength of the flange 27 to further surely support the contact portion 31 by the flange 27 and the bottom wall portion 24 therebetween. Moreover, according to the bumper device of the embodiment, the main wall portion 31 of the bumper reinforcement 16 may be firmly supported between the flange 27 and the bottom wall portion 24 that is formed into a flat plate.

According to the bumper device of the embodiment, a special forming technique such as an electromagnetic forming technique is not necessary for connecting the crush boxes 13 to the bumper reinforcement 16.

According to the bumper device of the embodiment, as described above, in the case that the impact due to the front collision of the vehicle is applied to the bumper reinforcement 16 (from the front side) in the longitudinal direction, the crush boxes 13 are permanently deformed in a prompt manner. As a result, the crush boxes 13 may further effectively absorb the energy of the impact.

The bumper device according to the embodiment may be modified as follows. FIG. 3A shows the bumper reinforcement 16 according to a first modified example of the embodiment. As illustrated in FIG. 3A, a fixing nut 51 utilized for towing the vehicle may be fixed to the central portion of the bottom wall portion 24. In particular, the fixing nut 51 includes a nut portion 52 inserted in the insertion portion 26, and an attachment flange 53 having an approximately annular shape or plural divided portions (for example, two divided portions) circumferentially divided. The attachment flange 53 extends radially outwardly from the nut portion 52. A surface of the attachment flange 53, which faces the insertion portion 26 in a direction of the central axis, is fitted to the bottom wall portion 24. In addition, the nut portion 52 having an outer diameter substantially equal to the inner diameter of the insertion portion 26 is screwed with an external threaded portion formed at an eyebolt 56 for the fixing nut 51. In the case that the nut portion 52 is screwed with the eyebolt 56, the fixing nut 51 is fitted to the bottom wall portion 24 in such a way the bottom wall portion 24 and the flange 27 supporting therebetween the main wall portion 31 and overlapping each other are further overlapped by the attachment flange 53 along the central axis. For example, in a case where the vehicle is towed, a tensile load acting from the eyebolt 56 relative to the fixing nut 51 is surely supported via the attachment flange 53 by the bottom wall portion 24 and the flange 27. Accordingly, in the bumper device according to the first modified example, a reinforcement plate P for reinforcing the fixing nut 51 is not necessarily arranged between the bottom wall portion 24 and the attachment flange 53 as in a known bumper device illustrated in FIG. 3B and not including the flange 27 according to the embodiment. Consequently, an increase of components of the bumper device according to the embodiment may be minimized even in the case that the fixing nut 51 is connected to the flange 27 and the bottom wall portion 24. In addition, according to the bumper device of the embodiment, a length of the reinforcement plate P in the longitudinal direction of the vehicle is not included in the direction of the central axis, therefore reducing the size of each of the crush boxes 13 in the longitudinal direction.

Figure 4B:
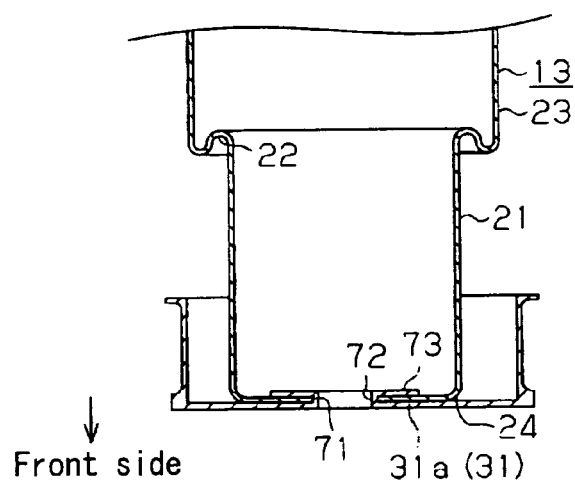
FIG. 4B is a cross-sectional view of the bumper reinforcement according to the second modified example of the embodiment disclosed here.

FIGS. 4A and 4B show the bumper reinforcement 16 according to a second modified example of the embodiment. A different connection structure between the bumper reinforcement 16 and the crush boxes 13 from the connection structure described in the embodiment is adapted to the second modified example. In particular, as illustrated in FIGS. 4A and 4B, a fitting bore 71 having an approximately circular shape is formed in the central portion of the bottom wall portion 24 of each of the crush boxes 13. On the other hand, an insertion portion 72 formed into a substantially cylindrical shape is formed at the central portion of the contact portion 31a so as to protrude therefrom toward the crush box 13. The insertion portion 72 is inserted in the fitting bore 71 of the crush box 13. Further, a flange 73 having an approximately annular shape is formed so as to radially outwardly extend from an edge (rear edge) of the insertion portion 72. The flange 73 is crimped to a circumferential edge of the fitting bore 71 so as to be fixed therearound. Further, the bottom wall portion 24 is supported between the contact portion 31a and the flange 73 so as to be positioned around the circumferential edge of the fitting bore 71. Thus, the bumper reinforcement 16 and the crush boxes 13 are connected to one another. In the above-mentioned connection structure between the bumper reinforcement 16 and the crush boxes 13, the bumper reinforcement 16 including the flange 73 is recommended to be formed of the material having the rigidity higher than the rigidity of the material of the crush box 13. Similar effects to those in the embodiment may be obtained in the second modified example.

Moreover, in the bumper device according to the embodiment, materials may be selectively applied to the bumper reinforcement 16 and the crush box 13, respectively. For instance, in a case where the bumper reinforcement 16 and the crush box 13 are manufactured by different materials (first and second materials), a first member (either one of the bumper reinforcement 16 and the crush box 13), for example, including a flange to be crimped, is recommended to be formed of the first material having rigidity higher than rigidity of the second material of a second member (the other one of the bumper reinforcement 16 and the crush box 13) in which a fitting bore is formed. The second member formed of the second material is supported by the flange of the first member formed of the first material (the first member will be hereinafter referred to as a supporting member while the second member will be referred to as a supported member). For example, in a case where the supporting member is made of iron, the supported member may be made of light metal such as aluminum and magnesium or may be made of resin. Alternatively, in a case where the supporting member is made of aluminum or aluminum alloy, the supported member may be made of magnesium or magnesium alloy or may be made of resin.

According to the bumper device of the embodiment, each of the small-diameter portion 21 and the large-diameter portion 23 of the crush box 13 may be formed into a cylindrical hollow shape having slightly flattened portions on an outer surface. Alternatively, the crush box 13 may be configured to be permanently deformed into concertinas along the central axis, thereby absorbing the energy of the impact in the longitudinal direction.

In addition, the bumper device according to the embodiment may be adapted to a rear portion of the vehicle.

As described above, according to the aforementioned embodiment, the bumper device includes the bumper reinforcement 16 extending in the width direction of the vehicle, the crush box 13 extending in the longitudinal direction of the vehicle and being connected to the end portion of the bumper reinforcement 16 in the width direction, the crush box 13 being formed into the cylindrical hollow shape and including the bottom wall portion 24 that is in contact with the bumper reinforcement 16 in the longitudinal direction, the fitting bore 36, 71 formed in either one of the bottom wall portion 24 of the crush box 13 and the main wall portion 31 of the bumper reinforcement 16, the main wall portion 31 being in contact with the bottom wall portion 24, the insertion portion 26, 72 formed at the other one of the bottom wall portion 24 and the main wall portion 31 and inserted in the fitting bore 36, 71 to be fitted thereto, the insertion portion 26, 72 being formed into the hollow cylindrical shape, and the flange 27, 73 extending from the edge of the insertion portion 26, 72, wherein the one of the bottom wall portion 24 and the main wall portion 31, including the fitting bore 36, 71 is supported by the flange 27, 73 and the other one of the bottom wall portion 24 and the main wall portion 31, including the flange 27, 73.

According to the configuration of the bumper device of the embodiment, the bolts and the nuts are not needed to connect or fix the crush box 13 to the bumper reinforcement 16, resulting in a reduction of components of the bumper device. In addition, because the axial length of the head portion of each of the bolts and the axial length of each of the nuts are not included in the length of the crush box 13 along the central axis (in the longitudinal direction of the vehicle), the length of the crush box 13 in the longitudinal direction is inhibited from increasing. As a result, the size of the crush box 13 is reduced.

According to the aforementioned embodiment, the bumper reinforcement 16 and the crush box 13 are made of the first and second materials differing from each other. The other one of the bottom wall portion 24 and the main wall portion 31, including the flange 27, 73 is made of the first material having the rigidity higher than the rigidity of the second material of the one of the bottom wall portion 24 and the main wall portion 31, including the fitting bore 36, 71.

Accordingly, the main wall portion 31 including the fitting bore 36 is firmly supported between the flange 27 and the bottom wall portion 24 of the crush box 13 or the bottom wall portion 24 including the fitting bore 71 is firmly supported by the flange 73 and the main wall portion 31 of the bumper reinforcement 16. In addition, the strengths of the materials described here are related to the strengths of the bumper reinforcement 16 and the crush box 13 that are formed and hardened. For example, in a stage where the materials are not processed, the other one of the bottom wall portion 24 and the main wall portion 31, including the flange 27, 73 is softer than the one of the bottom wall portion 24 and the main wall portion 31, including the fitting bore 36, 71. Even in such case, the materials may not deviate from the purpose of the bumper device according to the embodiment as long as the aforementioned relationship between the strengths of the hardened bottom wall portion 24 and the hardened main wall portion 31 is secured.

According to the aforementioned embodiment, the flange 27, 73 continuously and entirely extends along the circumferential edge of the fitting bore 36, 71.

Accordingly, the strength of the flange 27, 73 may be secured. Consequently, the main wall portion 31 including the fitting bore 36 is firmly supported between the flange 27 and the bottom wall portion 24 of the crush box 13 or the bottom wall portion 24 including the fitting bore 71 is firmly supported by the flange 73 and the main wall portion 31 of the bumper reinforcement 16.

According to the aforementioned embodiment, the bumper device further includes the fixing nut 51 for towing the vehicle. The fixing nut 51 includes the nut portion 52 inserted in the insertion portion 26 and the attachment flange 53 extending radially outwardly from the nut portion 52. The fitting bore 36 is formed in the main wall portion 31, and the insertion portion 26 and the flange 27 are formed at the bottom wall portion 24. The surface of the attachment flange 53, which axially faces the insertion portion 26, is fitted to the bottom wall portion 24.

Accordingly, the reinforcement plate P for reinforcing the fixing nut 51 is not additionally needed between the bottom wall portion 24 and the attachment flange 53. As a result, the number of components of the bumper device may be minimized.

According to the aforementioned embodiment, the flange 27, 73 extends radially outwardly from the edge of the insertion portion 26, 72.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A bumper device for a vehicle, comprising:
a bumper reinforcement extending in a width direction of the vehicle;
a connecting member extending in a longitudinal direction of the vehicle and being connected to an end portion of the bumper reinforcement in the width direction, the connecting member being formed into a cylindrical hollow shape and including a bottom wall portion that is in contact with the bumper reinforcement in the longitudinal direction;
a fitting bore formed in either one of the bottom wall portion of the connecting member and
a contact wall portion of the bumper reinforcement, the contact wall portion being in contact with the bottom wall portion;
an insertion portion formed at the other one of the bottom wall portion and the contact wall portion and inserted in the fitting bore to be fitted thereto, the insertion portion being formed into a hollow cylindrical shape;
a flange extending from an edge of the insertion portion, and
a fixing nut for towing the vehicle, the fixing nut including a nut portion inserted in the insertion portion and an attachment flange extending radially outwardly from the nut portion, wherein the fitting bore is formed in the contact wall portion, and the insertion portion and the flange are formed at the bottom wall portion,
wherein the one of the bottom wall portion and the contact wall portion, including the fitting bore is supported by the flange and the other one of the bottom wall portion and the contact wall portion, including the flange; and
wherein a surface of the attachment flange, which axially faces the insertion portion, is fitted to the bottom wall portion.

2. The bumper device according to claim 1, wherein the bumper reinforcement and the connecting member are made of first and second materials differing from each other, and
wherein the other one of the bottom wall portion and the contact wall portion, including the flange is made of the first material having rigidity higher than rigidity of the second material of the one of the bottom wall portion and the contact wall portion, including the fitting bore.

3. The bumper device according to claim 1, wherein the flange continuously and entirely extends along a circumferential edge of the fitting bore.

4. The bumper device according to claim 1, wherein the connecting member includes a large diameter portion, an annular stepped portion, and a small diameter portion.

* * * * *